PULSE AMPLIFIER INCLUDING COMPLEMENTARY TRANSISTORS

Filed April 1, 1963 2 Sheets-Sheet 1

Inventor
ANDRÉ MINGAUD
By [signature]
Attorney

March 15, 1966 A. MINGAUD 3,241,081

PULSE AMPLIFIER INCLUDING COMPLEMENTARY TRANSISTORS

Filed April 1, 1963 2 Sheets-Sheet 1

Inventor
ANDRÉ MINGAUD
By [signature]
Attorney

United States Patent Office 3,241,081
Patented Mar. 15, 1966

3,241,081
PULSE AMPLIFIER INCLUDING COMPLEMENTARY TRANSISTORS

André Mingaud, Ivry, France, assignor to International Standard Electric Corporation, New York, N.Y., a corporation of Delaware Filed Apr. 1, 1963, Ser. No. 269,590
Claims priority, application France, Apr. 6, 1962, 893,611, Patent 1,330,167
4 Claims. (Cl. 330—17)

Binary information is currently stored in memories, such as magnetic memories. Then, when desired, the memories are read in order to take out what they contain. The read-out signals are provided for acting upon electronic relays such as bistable circuits, but they are not directly utilizable since their power and duration are too small. Therefore, an amplifier with proper characteristics must be inserted in the memory readout circuit.

The purpose of this invention is to realize such an amplifier of simple and economical design, which will be unresponsive to noise increments.

Our feature of the invention is a reading amplifier constituted by the combination of the following units:

(a) A transformer to raise the voltage of the input signal;

(b) A first amplifying stage which, at rest condition, operates class A;

(c) A second amplifying stage, from which the output signal is taken, coupled to the first one, normally blocked, but saturated as soon as the input signal is received;

(d) A feedback path from the second stage to the first one which maintains the saturation even when the input signal has disappeared;

(e) A time-limit device which brings the saturation to an end, at the end of a certain time-limit, the second stage being rapidly blocked because of the presence of the feedback circuit, which puts an end to the output signal.

Another feature of the invention relates to the fact that the secondary winding of the input transformer includes two parts each placed in series with a diode, so that a signal is applied to the first amplifying stage, which signal always has the same direction whatever the direction of the input signal may be.

Another feature of the invention is to constitute the first amplifying stage by a transistor of a certain type (pnp for instance) the base of which is connected to the secondary winding of the input transformer and the second stage by a transistor of another type (npn) which delivers the output signal in its collector circuit, a double coupling being provided between said two stages, the first one between the collector of the first transistor and the base of the second transistor, and the other one between the emitters of the two transistors.

Another feature of the invention is that when the second transistor is saturated and the collector-emitter impedance becomes very small, that the circuit behaves as if the charging resistor of the reading amplifier was arranged in parallel with the resistor of the emitter of the first transistor, so that the emitter current of the second transistor increases, thus confirming the saturation of the second transistor and maintaining said saturation even when the input signal has disappeared.

Another feature of the invention is that when the second transistor is saturated, the emitter current of the first transistor increases until said first transistor is also saturated.

Another feature of the invention is to couple the collector of the first transistor with the base of the second one through a condenser and a resistor so that, when the output signal appears, the condenser discharges through the resistor and the two transistors, holding the second transistor saturated. When the discharging current falls below a certain threshold, the second transistor ceases to be saturated and by feedbmack effect causes the potential of the collector of the first transistor to vary, further decreasing the discharging current, and thereby causing the second transistor to be rapidly blocked, thus putting an end to the output signal.

Another feature of the invention is to shunt the bias resistor of the base of the second transistor by a diode, so that when the second transistor is blocked, the diode is made conducting enabling the condenser to be rapidly brought to its initial charging condition, allowing the amplifier to be immediately used again.

Another feature of the invention is to provide, among the initial conditions of the reading amplifier, for a certain threshold in order to obtain the unblocking condition of the second transistor, so that the incremental noises remain without any effect.

Another feature of the invention is that when a low-amplitude signal (incremental noise) is received, the two diodes associated with the secondary winding of the input transformer cannot be blocked, as the secondary impedance reflected back into the primary winding is low in relation to the internal impedance of the signalling generator, so that practically no signal is received at the input of the first amplifying stage, the noise remaining without effect for this second reason.

Another feature of the invention is the fact that a suitable bias voltage is applied upon the base of the second transistor to block the reading amplifier, and at the same time, modify the charging condition of the connecting condenser. When this blocking voltage disappears, the condenser charges rapidly through the diode shunting the bias resistor of the second transistor, allowing the amplifier to be immediately used again.

These and various other features will be better understood by considering the following description in conjunction with the accompanying drawing in which.

Figures 1, 3:
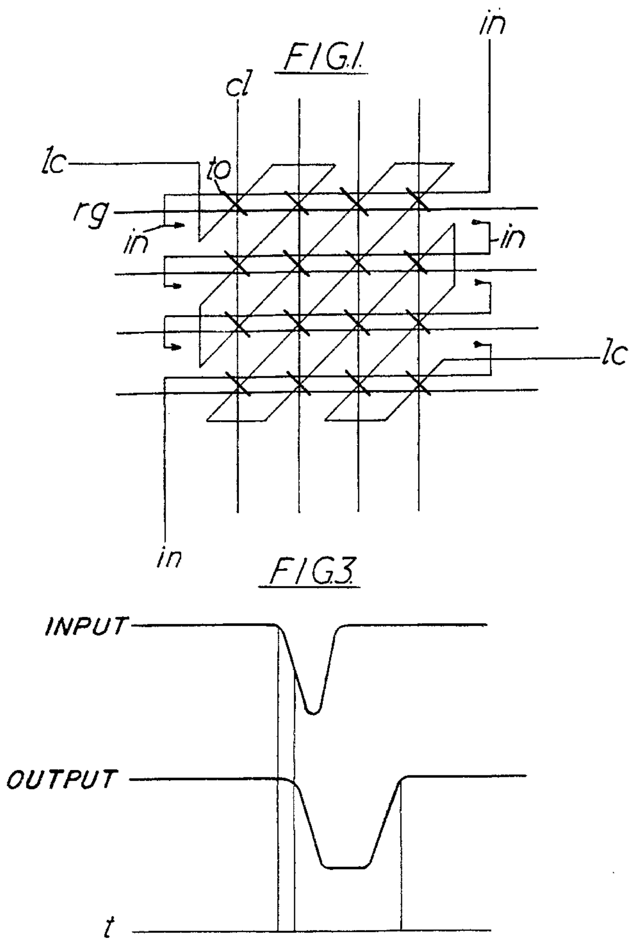
FIGURE 1 is a schematic diagram of a ferrite core matrix for the registering of binary information.
FIGURE 3 is a diagram of the input and output impulses.

The invention is described for the read-out of information stored in ferrite core matrices, but the solution given is general and can be applied to any situation where the received signal must be highly amplified and where its duration must be prolonged while eliminating interfering noises.

*Ferrite core matrix.*—To facilitate an understanding of the following description, the principles of operation of a ferrite core matrix will now be briefly described. The cores *to* (FIGURE 1) are arranged in rows and columns. Through each of them go four wires, a row wire *rg* common to all the cores in the same row, a column wire *cl* common to all the cores in the same column, an inhibition wire *in* and a reading wire *lc* common to all the cores. The hysterersis loop of the chosen material is fairly rectangular, so that each core is likely to occupy two distinct magnetic states and two only. The first state corresponds to the bit "0" and the second state to the bit "1."

First it will be assumed that all the cores are in the state "0." For writing a "1" in one of them, say core *to*, a $+I/2$ current is sent into the row wire *rg* and a $+I/2$ current is sent into the corresponding column wire. The $+I/2$ current could not cause the change of state or triggering of the core, but the combination of the two $I/2$ currents achieves this operation with certainty.

The selection of a core can be effected by sending a $+I/2$ current into the row wire and into the column wire, but without causing any writing operation. To do so, a $-I/2$ current is sent into the inhibition wire *in*, which cancels the effect of the current of the row wire.

To read-out a core, a $-I/2$ current is sent into the row wire, and a $-I/2$ current into the column wire. In combination, the two currents tend to trigger the core to position 0. If the core is in position 1, it is brought to position 0 and the variation of flux so produced causes a signal to appear in the read-out wire *lc*; in turn, if the core is already in position 0, it remains on said position and no signal is received on the read-out wire. Thus, the read-out is completed with destruction of the bit of information. If it is desired to re-write said bit of information, the process is the same as that previously indicated. Practically, the hysteresis loop of the utilized material is not quite rectangular, so that the $-I/2$ current in the row wire causes a slight change of the magnetic state in all the cores of said row. In order to avoid adding the incremental noises so produced in the reading wire, the latter goes through two consecutive cores of the same row in opposite direction. The same observation is valid for the columns, so that finally there is obtained a zig-zag wiring for the reading wire, as indicated in the figure. The inhibition wire *in* must go through all the cores in the same direction.

Each address, corresponding to a determined row and column, permits the writing-in of one bit only. By utilizing several superposed core plans, a character, i.e., a combination of several bits, can be written in the cores; therefore, one character is obtained per address.

The electromotive force induced in the reading wire is low, of about 80 mv.; moreover, because of the presence of the cores associated with the reading wire, the internal impedance of the latter is not negligible, so that finally a voltage of about 45 mv. is obtained with an output current of about 1 ma. and an average time of 1.5 microsecond.

Figure 2:
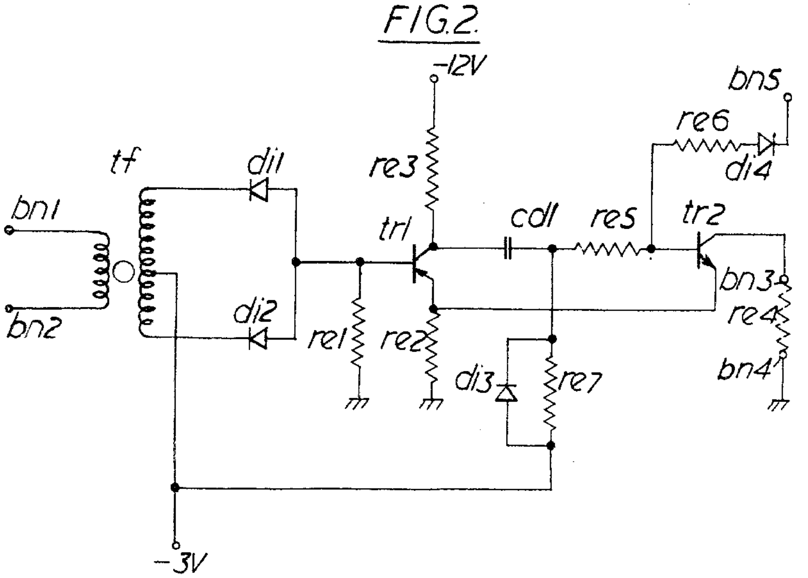
FIGURE 2 is a schematic diagram of a reading amplifier achieved according to the spirit of the invention.

*Reading amplifier, general operation.*—This amplifier (FIGURE 2) includes two input terminals *bn*1 and *bn*2, a step-up transformer *tf* wound on a core, two diodes *di*1 and *di*2 to rectify the received signals, two amplifying stages respectively constituted by transistors *tr*1 and *tr*2, and two output terminals *bn*3 and *bn*4. Between the two amplifying stages, a double coupling has been provided, one between the emitters of the two transistors and the other between the collector of the first transistor and the base of the second.

At rest, i.e., when no signal is received, the various circuit elements associated with transistor *tr*1 are dimensioned such that said transistor operates in class A, i.e., on the right hand part of its emitter-base current characteristic. Since the impedance of the emitter circuit seen from the base may be variable from one transistor to another, a stabilizing resistor *re*1 has been provided for maintaining said impedance within predetermined limits. A certain current flows through the emitter circuit as well as through the collector circuit. Because of voltage drops across resistors *re*2 and *re*3, there is a potential *ve*1 on the emitter and a potential *vc*1 on the collector. The coupling condenser *cd*1 is charged between the —3 v. potential and the potential *vc*1. The potential *ve*1 of the transistor emitter *tr*1 is directly applied to the transistor emitter *tr*2; said potential is a little more positive than the base potential (—3 v.) so that transistor *tr*2 is blocked. Under those conditions, no current flows in the charging resistance *re*4 branched between the output terminals *bn*3, *bn*4.

The signal received in the reading wire is applied to the primary winding of the transformer *tf* through the input terminals *bn*1, *bn*2. As the reading wire is wired in zig-zag, the direction of said signal mainly depends on the address of the core; according to the case, a secondary current will be gathered either through diode *di*1, or through diode *di*2, the other diode being blocked. The function of transformer *tf* consists in raising the voltage of the signal considerably, so that a variation of a fraction of a volt is obtained on the base of transistor *tr*1. The potential of the transistor emitter *tr*1 closely follows that of the base and also decreases a fraction of a volt. Let *ve*2 be the new value of said potential. In turn, the potential of the collector rises and reaches a new value *vc*2, thus a positive pulse is transmitted to the base of transistor *tr*2 through condenser *cd*1. As the base of transistor *tr*2 becomes more positive and the emitter more negative, said transistor becomes saturated. The emitter-collector impedance becomes very low, and the output terminal *bn*3 nears potential *ve*2. A current starts flowing through the charging resistor *re*4.

Since transistor *tr*2 is saturated, the circuit behaves as if the charging resistor *re*4 were arranged in parallel with resistor *re*2. Thus, the emitter current of transistor *tr*1 is increased further until *tr*1 saturates. The potential of the collector is thus further increased to a value *vc*3, and a new positive pulse is sent to the base of transistor *tr*2, which confirms the saturation.

Condenser *cd*1 discharges, according to an exponential law, through the following circuit: Resistor *re*5, base and emitter of transistor *tr*2, and emitter and collector of transistor *tr*1. During said discharge, the input signal comes to an end, but without appreciable effect upon the next operations.

When the discharging current of condenser *cd*1 decreases below a certain threshold, transistor *tr*2 ceases to be saturated. The emitter and collector currents of transistor *tr*1 then decrease; the potential of the collector of *tr*1 becomes more negative which further decreases the base current in transistor *tr*2. Therefore, a cumulative effect is obtained and transistor *tr*2 is rapidly blocked, which terminates the signal sent to the charging resistor *re*4. As transistor *tr*2 is blocked, the charging resistor *re*4 is removed from the emitter circuit of transistor *tr*1, and, as the input signal has disappeared, transistor *tr*1 is again in the same conditions of operation as it was at the beginning. The potentials of the emitter and of the collector respectively return to their values *ve*1 and *vc*1.

During the discharge of condenser *cd*1, the potential of the right hand terminal progressively nears that of the left hand terminal and, consequently, diminishes. When said potential reaches —3 volts, diode *di*3 conducts and said potential cannot decrease below said value. Lastly, said condenser charges again very quickly through diode *di*3 and resistor *re*3. The amplifier is again at its initial state.

In the voltage diagram of FIGURE 3, the input and output pulses have been represented. In order to make the figure clearer, the same scale has been used for the time-periods *t*, but different scales have been used for the voltages.

*Auxiliary arrangements.*—As has been indicated, transistor *tr*2 is normally blocked. If a suitable potential difference is provided between its base and its emitter, an operation threshold is created, and the amplifier will be unresponsive to low-valued signals, i.e., to incremental noise from the matrix. This is particularly valuable in the case of a reading amplifier for ferrite core matrices, since incremental noise cannot be completely eliminated even by wiring the reading wire in zig-zag.

There is a second protection against incremental noise provided by diodes *di*1 and *di*2. For normal signals, one of said diodes is made conducting and the other is not.

Figure 4:
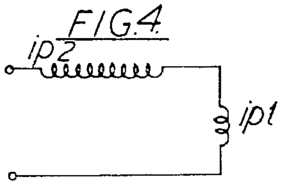
FIGURE 4 is the incoming circuit diagram of the amplifier in which the secondary impedance has been transferred into the primary winding.

For low-value signals, however, none of said diodes is made non-conducting and the circuit behaves as if the secondary winding of transformer *tf* were closed on a low-valued impedance. If said impedance is reflected back into the primary winding, considering the transformer ratio, there is obtained the diagram of FIGURE 4, in which *ip*1 designates said impedance and *ip*2 the internal impedance of the reading wire. As the value of impedance *ip*1 is low compared to that of *ip*2, practically no signal is obtained on the terminals of *ip*1.

In the logic circuits utilized in electronic switching, generally four elementary periods are provided for each operation. The first of said periods corresponds to the address selection; the second one to the reading-out of the information; the third one to logic operations; the fourth one to the writing-in of the information. In principle, the reading operation must be effected at period NO2 only; it can overlap period NO3 but must be over when the writing operation starts. In order to block the reading amplifier, a comparatively negative pulse of about −6 v. is applied to terminal *bn*5 when the writing operation starts. Then a current flows through the following circuit: −3 v. potential, diode *di*3, resistors *re*5 and *re*6, diode *di*4 and terminal *bn*5. Resistors *re*5 and *re*6 form a potential divider and enable to apply, to the base of transistor *tr*2, a potential negative enough to maintain said transistor blocked even if a signal is received on the input terminals. As soon as the blocking ptoential disappears, the base of transistor *tr*2 is brought back to −3 v. potential and the amplifier can be utilized again immediately.

Figure 5:
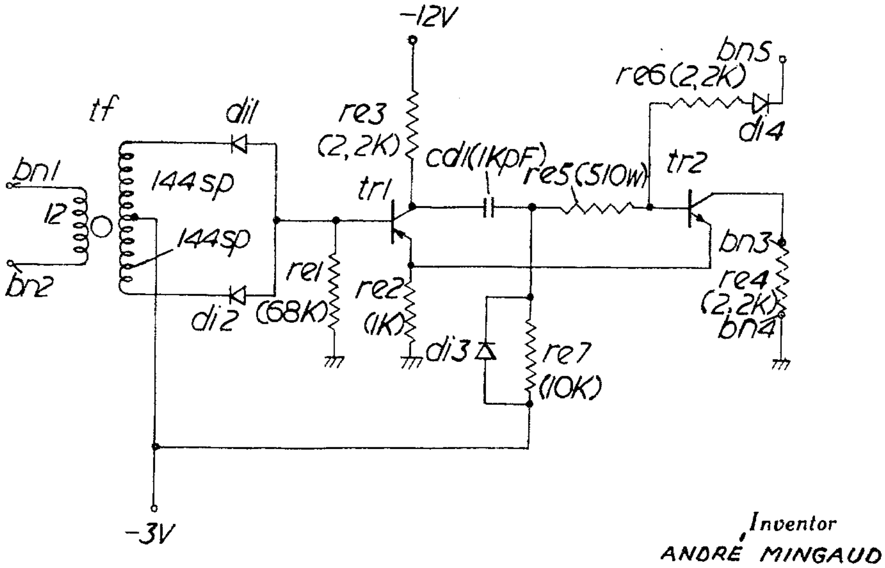
FIGURE 5 is a schematic diagram of a reading amplifier with numerical values of voltages, resistances and capacities.

*Embodiment of the invention.*—FIGURE 5 represents an embodiment of the amplifier and mentions the numerical values of voltages, resistances and capacities. 12 turns for the primary winding of transformer *tf* have been provided as well as 144 turns for each half of the secondary winding, which gives a transformation ratio of 12 and thereby a potential variation of about 0.5 v. on the base of transistor *tr*1 for an input signal of 45 mv. When there is no signal, a −2.8 v. is obtained on the base of transistor *tr*1 because of the fall of potential in the rectifying diodes, and a −2.7 v. is obtained for the potential of emitter *ve*1. A simple calculation then leads to the following values:

| | V. |
|---|---|
| *vc*1 | −6 |
| *ve*2 | −3.2 |
| *vc*2 | −5 |
| *ve*3 | −2.8 |
| *vc*3 | −2.8 |

Under those circumstances, a voltage of 2.8 v. is obtained on the terminals of the charging resistor, which corresponds to a current of 1.3 ma. The duration of the input signal is of about 1 microsecond, that of the output signal is of 3 microseconds.

The minimum input signal necessary for the saturation of the amplifier is 45 mv.

It is clear that the preceding descriptions have only been given as an unrestrictive example and that numerous alternatives may be considered without departing from the scope of the invention. For instance, amplifying stages of another type could be utilized, a transistor npn could be provided for the first stage as well as a transistor pnp for the second one, the feedback circuit could be modified and other delays could be provided for fixing the duration of the signal. More particularly, the various numerical data have only been mentioned as an example in order to make the comprehension of the operation easier, and are likely to vary with each particular case.

What is claimed is:

1. A pulse amplifier comprising:

a first transistor amplifier stage having an input and an output;

first means coupled to said first amplifier to maintain said first amplifier normally in a quiescent conducting state;

second means coupled to said first amplifier to receive and apply an input pulse to the input of said first amplifier to increase the current flow through said first amplifier, thereby changing the potential at the output of said first amplifier;

a second transistor amplifier stage having an input and an output, said second transistor being of opposite conductivity to said first transistor;

third means coupled to said second amplifier to maintain said second amplifier normally in a quiescent non-conducting state;

fourth means including a resistor and a capacitor coupled between said first and second amplifiers to apply said change in potential at the output of said first amplifier to the input of said second amplifier to cause said second amplifier to conduct and saturate responsive to said change in potential; and feedback means coupled between said first amplifier and said second amplifier to saturate said first amplifier responsive to the conduction of said second amplifier, thereby extending the period of conduction of said second amplifier;

said capacitor discharging through said resistor, said amplifiers and said feedback means to return said second amplifier to its non-conducting quiescent state and return said first amplifier to its conducting quiescent state after being discharged a predetermined amount.

2. An amplifier according to claim 1 wherein said second means comprises:

a transformer, the secondary winding of which is center tapped, dividing said secondary winding into an upper and a lower part; and two diodes, one coupling said upper part to said input of said first amplifier, and the other coupling said lower part to said input of said first amplifier, said diodes being so arranged that the signal applied to said input of said amplifier is always of the same polarity regardless of the polarity of said input pulse.

3. An amplifying device according to claim 2 wherein said diodes are conductive for an input pulse having a magnitude above a predetermined minimum value thereby providing a threshold below which said amplifying device will not respond.

4. A pulse amplifier including:

a transformer for receiving an input pulse;

a first transistor amplifier stage having an input and an output;

first means coupled to said first amplifier to maintain said first amplifier normally in a quiescent state conducting at a level less than its saturation level;

a second transistor amplifier stage having an input and an output, said second transistor being of opposite conductivity to said first transistor;

second means coupled to said second amplifier to maintain said second amplifier normally in a quiescent non-conductive state;

third means coupling said transformer to the base of said first amplifier to apply said input pulse to said base, thereby increasing the current flow through said first transistor;

fourth means including a resistor and a capacitor coupled between said first and second amplifiers to apply the signal established at the output of said first amplifier to the input of said second amplifier to cause said second amplifier to conduct and saturate;

fifth means directly coupling the emitters of said first and second transistors to effect positive feedback from said second transistor to said first transistor thereby saturating said first transistor when said second transistor goes into saturation, and causing said second transistor to conduct for a longer period than if said feedback had not been provided, said capacitor discharging through said resistor, said amplifiers and said third means to return said second amplifier to its non-conducting quiescent state and return said first amplifier to its conducting quiescent state; and an output utilization device coupled in the collector circuit of said second amplifier stage across which an output pulse larger in amplitude and longer in duration than said input pulse is developed.

References Cited by the Examiner

UNITED STATES PATENTS

| | | | |
|---|---|---|---|
| 2,683,806 | 7/1954 | Moody | 328—150 X |
| 3,073,968 | 1/1963 | Tribby. | |
| 3,166,678 | 1/1965 | Fleshman, et al. | |

ROY LAKE, *Primary Examiner.*